United States Patent [19]
Cheong et al.

[11] Patent Number: 5,974,524
[45] Date of Patent: Oct. 26, 1999

[54] METHOD AND APPARATUS FOR REDUCING THE NUMBER OF RENAME REGISTERS IN A PROCESSOR SUPPORTING OUT-OF-ORDER EXECUTION

[75] Inventors: Hoichi Cheong; Paul Joseph Jordan; Quan Nguyen; Hung Qui Le, all of Austin, Tex.

[73] Assignee: International Business Machines Corporation, Armonk, N.Y.

[21] Appl. No.: 08/959,647

[22] Filed: Oct. 28, 1997

[51] Int. Cl.⁶ .................................................. G06F 9/46
[52] U.S. Cl. .............................. 712/23; 712/218; 712/244
[58] Field of Search .............................. 710/260; 712/23, 712/217, 216, 228, 223, 212

[56] References Cited

U.S. PATENT DOCUMENTS

| | | | |
|---|---|---|---|
| 5,805,906 | 9/1998 | Cheong et al. | 710/260 |
| 5,860,014 | 1/1999 | Cheong et al. | 710/260 |
| 5,870,582 | 2/1999 | Cheong et al. | 712/218 |
| 5,870,612 | 2/1999 | Cheong et al. | 710/260 |
| 5,875,326 | 2/1999 | Cheong et al. | 712/244 |
| 5,884,062 | 3/1999 | Wickman et al. | 712/218 |
| 5,887,161 | 3/1999 | Cheong et al. | 712/244 |

Primary Examiner—Larry D. Donaghue
Attorney, Agent, or Firm—Matthew G. Reeves; Anthony V.S. England

[57] ABSTRACT

According to one aspect of the invention, a method is provided for maintaining the state of a processor having a plurality of physical registers and a rename register map which stores rename pairs that associate architected and physical registers, the rename register map having a plurality of entries which are associated with the physical registers, individual entries having an architected register field, an architected status bit and a history status bit. In one version, the method includes the steps of dispatching an instruction which targets an architected register; determining a presently architected entry in the rename register map in which an architected pointer in the architected register field of the entry matches the architected register pointer of the architected register targeted by the dispatched instruction and the architected status bit is set; resetting the architected status bit; setting the history status bit in the entry and saving the physical register pointer to a checkpoint recovery table if the dispatched instruction is interruptible or if the architected register of the dispatched instruction has not been targeted since the latest dispatched interruptible instruction; determining a next available rename register map entry; writing a pointer to the architected register targeted by the instruction into the architected register field and setting the architected status bit in the next available rename register map entry.

22 Claims, 9 Drawing Sheets

| PHYSICAL REG. # | GPR # | A-BIT | H-BIT | TID |
|---|---|---|---|---|
| 0 | | | | |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |

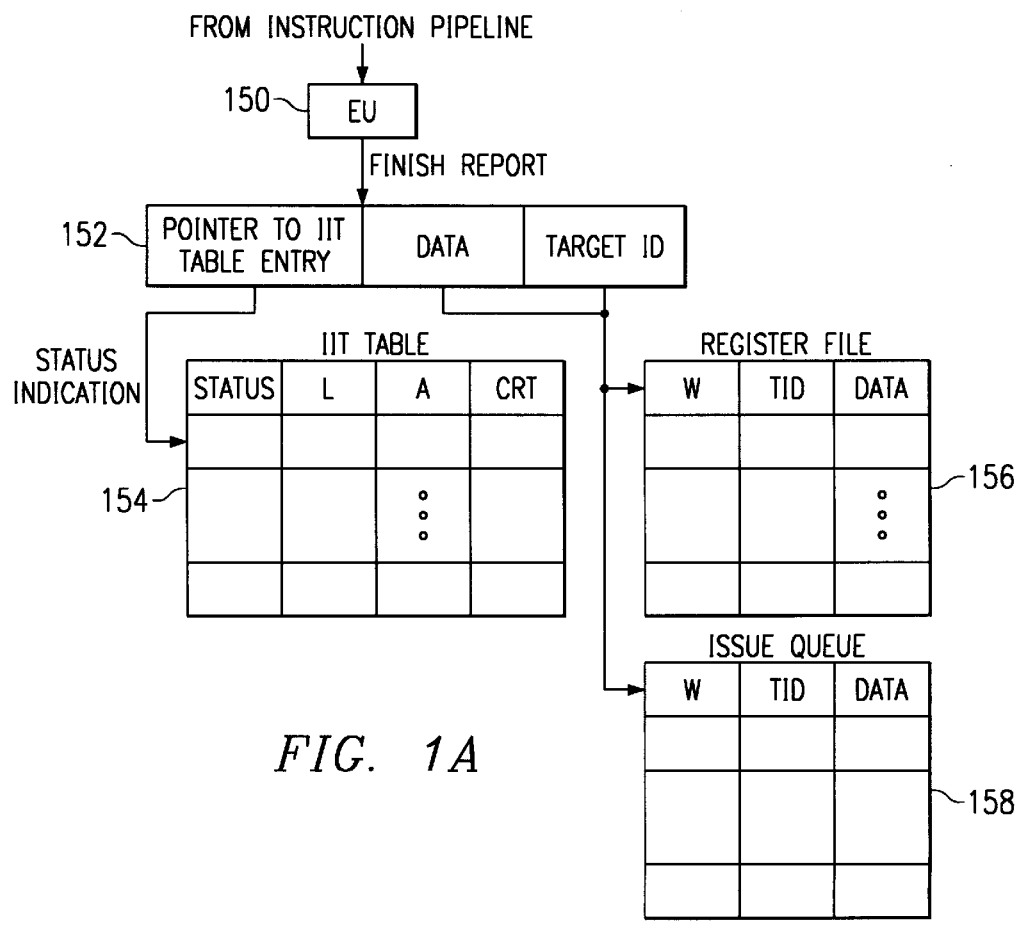

INTERRUPTIBLE INSTRUCTION TABLE

| A-VECTOR FIELD | L-VECTOR FIELD | CRT ENTRY POINTER |
|---|---|---|
| | | |
| | | |
| | | |
| | | |
| | | |
| | | |
| | | |
| | | |
| | | |
| | | |
| | | |
| | | |
| | | |
| | | |
| | | |

*FIG. 4*

CHECKPOINT RECOVERY TABLE

| VALID BIT | PHYSICAL REG POINTER |
|---|---|
| | |
| | |
| | |
| | |
| | |
| | |
| | |
| | |
| | |

*FIG. 5A*

L-VECTOR

| BIT 0 | BIT 1 | BIT 2 | BIT 3 |
|---|---|---|---|

*FIG. 5B*

METHOD AND APPARATUS FOR REDUCING THE NUMBER OF RENAME REGISTERS IN A PROCESSOR SUPPORTING OUT-OF-ORDER EXECUTION

TECHNICAL FIELD

The present invention relates generally to computer architectures. More particularly, the invention relates to the architecture and use of registers within a superscalar processor. Still more particularly, the invention relates to techniques for reducing the number of rename registers required to support out-of-order execution of instructions in a superscalar architecture.

BACKGROUND OF THE INVENTION

Contemporary computing systems seek to take advantage of superscalar architectures to improve processing performance. Superscalar architectures are is characterized by multiple and concurrently operable execution units integrated through a plurality of registers and control mechanisms. This allows the architecture to execute multiple instructions in an out-of-order sequence, thus utilizing parallelism to increase the throughput of the system.

Although superscalar architectures provide benefits in improving processor performance, there are numerous difficulties involved in developing practical systems. For example, the control mechanism must manage dependencies among the data being concurrently processed by the multiple execution units. Another problem is that of mispredicted branches. When instructions are being executed out-of-order, the processor may predict the outcome of an instruction that could result in a branch in program flow. Otherwise, the processor would have to wait, or stall, until the branching instruction completed. This would reduce the effectiveness of out-of-order execution, since the benefits of parallel execution would be countered by delays in instruction issue each time an instruction is dispatched that could result in a branch. Of course, if a branch is mispredicted, then the processor must have the ability to recover to the state immediately prior to the branch so that the error can be corrected.

A variety of techniques have been devised to address these difficulties. Some of these techniques are discussed in Johnson, et al., *Superscalar Microprocessor Design*, Prentice Hall (1991). One particular technique is referred to as "register renaming." Register renaming involves forming an association between a physical register in the processor and a particular architectural, or logical, register. This relationship is referred to as a "rename pair," and is created each time an instruction writes to an architected register. The associations are maintained in a map within the processor which allows the processor to recover if a branch is mispredicted. This is explained in more detail with respect to FIG. 1.

FIG. 1 depicts a register mapping table ("RMAP") which is used to track rename pairs. The RMAP includes a plurality of entries, one entry for each of n physical registers. In this case, there is shown an RMAP for a processor with 10 physical registers. Each entry in the RMAP includes an architected status bit, or "A-bit" field and an architected register field. The architected register field contains a pointer to the if architected register that forms an architectural-physical pair with the physical register corresponding to the index of the entry. The A-bit indicates whether this architectural-physical pair is the most recent or not.

In conventional systems, only the A-bit is provided for in the RMAP. On dispatch, when an instruction needs a particular architected GPR as a source operand, the GPR pointer is compared to every architected pointer in the RMAP. Typically, the RMAP is implemented as a content addressed memory ("CAM") and the GPR pointer is applied to a read port of the CAM. If the A-bit of the matching entry is on, the corresponding output of the read port supplies the physical GPR pointer either in a decoded bit vector form or in a binary coded number. The output is then used to address the physical register for operand access. When an instruction that needs a target architected register is dispatched, the A-bit of the CAM entry that matched the architected target register is reset. At the same time, a new entry is assigned to form a new rename pair for the target architected register. The rename pair is formed by writing the architected GPR pointer into the next available RMAP entry corresponding to a free physical register, and setting the corresponding A-bit. The physical register pointer of the old rename pair is stored with the dispatched instruction in an instruction completion buffer. When the instruction completes, the physical register stored with the instruction is released back to the available physical register pool again. When an interruptible instruction, such as a branch instruction, is dispatched, the A column of the RMAP is stored to a table entry associated with the instruction. If the interruptible instruction causes an exception which requires a flush of the speculatively executed instructions, then the A column corresponding to the excepting instruction is retrieved and written back to the RMAP. Essentially, this restores the rename map to its state immediately prior to the execution of the interruptible instruction.

However, physical registers are a limited resource on a processor. In order to sustain a higher number of active instructions, more physical registers are required. Since only a limited number of physical registers can be provided on a processor, there is a limit to the number of instructions which can be processed in parallel. Since conventional processors do not provide for reuse of physical registers until the instruction that created the rename pair completes, the practical limit is even lower. Accordingly, it is an object of the present invention to provide a processor which overcomes this disadvantage. It is a further object of the present invention to provide techniques for improving the out-of-order processing capabilities of superscalar processors. Still further objects and advantages of the present invention will become apparent in view of the following disclosure.

SUMMARY OF THE INVENTION

One aspect of the invention relates to a method for maintaining the state of a processor having a plurality of physical registers and a rename register map which stores rename pairs that associate architected and physical registers, the rename register map having a plurality of entries which are associated with the physical registers, individual entries having an architected register field, an architected status bit and a history status bit. In one embodiment, the method comprises the steps of dispatching an instruction which targets an architected register; determining a presently architected entry in the rename register map in which an architected pointer in the architected register field of the entry matches the architected register pointer of the architected register targeted by the dispatched instruction and the architected status bit is set; if the dispatched instruction is interruptible: resetting the architected status bit and setting the history status bit in the entry; determining a next available rename register map entry; writing the architected pointer targeted by the instruction into the architected register field and setting the architected status bit in the next available rename register map entry.

Another aspect of the invention relates to a method for operating a processor. In one embodiment, the method comprises the step of dispatching an instruction; determining a presently architected RMAP entry for the architectural register targeted by the dispatched instruction; determining whether the dispatched instruction is interruptible; and updating an architectural indicator and an historical indicator in the presently architected RMAP entry.

Still a further aspect of the invention relates to an apparatus for maintaining the state of a processor having a plurality of physical registers and a rename register map which stores rename pairs that associate architected and physical registers, the rename register map having a plurality of entries which are associated with the physical registers, individual entries having an architected register field, an architected status bit and a history status bit. In one embodiment, the apparatus comprises means for dispatching an instruction which targets an architected register; means for determining a presently architected entry in the rename register map in which an architected pointer in the architected register field of the entry matches the architected register pointer of the architected register targeted by the dispatched instruction and the architected status bit is set; means for resetting the architected status bit and setting the history status bit in the entry if the dispatched instruction is interruptible; means for determining a next available rename register map entry; means for writing an architected register pointer to the architected register targeted by the instruction into the architected register field and setting the architected status bit in the next available rename register map entry.

BRIEF DESCRIPTION OF DRAWINGS

FIG. 1 depicts the logical contents of a conventional rename register map.

FIG. 1A depicts the operation of the processor generating a finish report according to an embodiment of the invention.

FIG. 2 depicts the logical contents of a rename register map according to an embodiment of the invention.

FIG. 4 depicts the logical contents of an interruptible instruction table useful according to embodiments of the invention.

FIG. 5A depicts the logical contents of a checkpoint recovery table according to embodiments of the invention.

FIG. 5B depicts a logical vector according to an embodiment of the invention.

DETAILED DESCRIPTION OF EMBODIMENTS OF THE INVENTION

Embodiments of the present invention will be described with respect to the exemplary PowerPC Architecture, which is described in detail in publications such as the *"PowerPC 603 Risc Microprocessor Technical Summary,"* available from IBM as Order No. MPR603TSU-03. However, those of skill in the art will recognize that this is for purposes of illustration only and the present invention is readily adaptable to numerous other superscalar processor architectures. A processor system useful for practicing embodiments of the invention is described with respect to FIG. 7.

Figure 7:
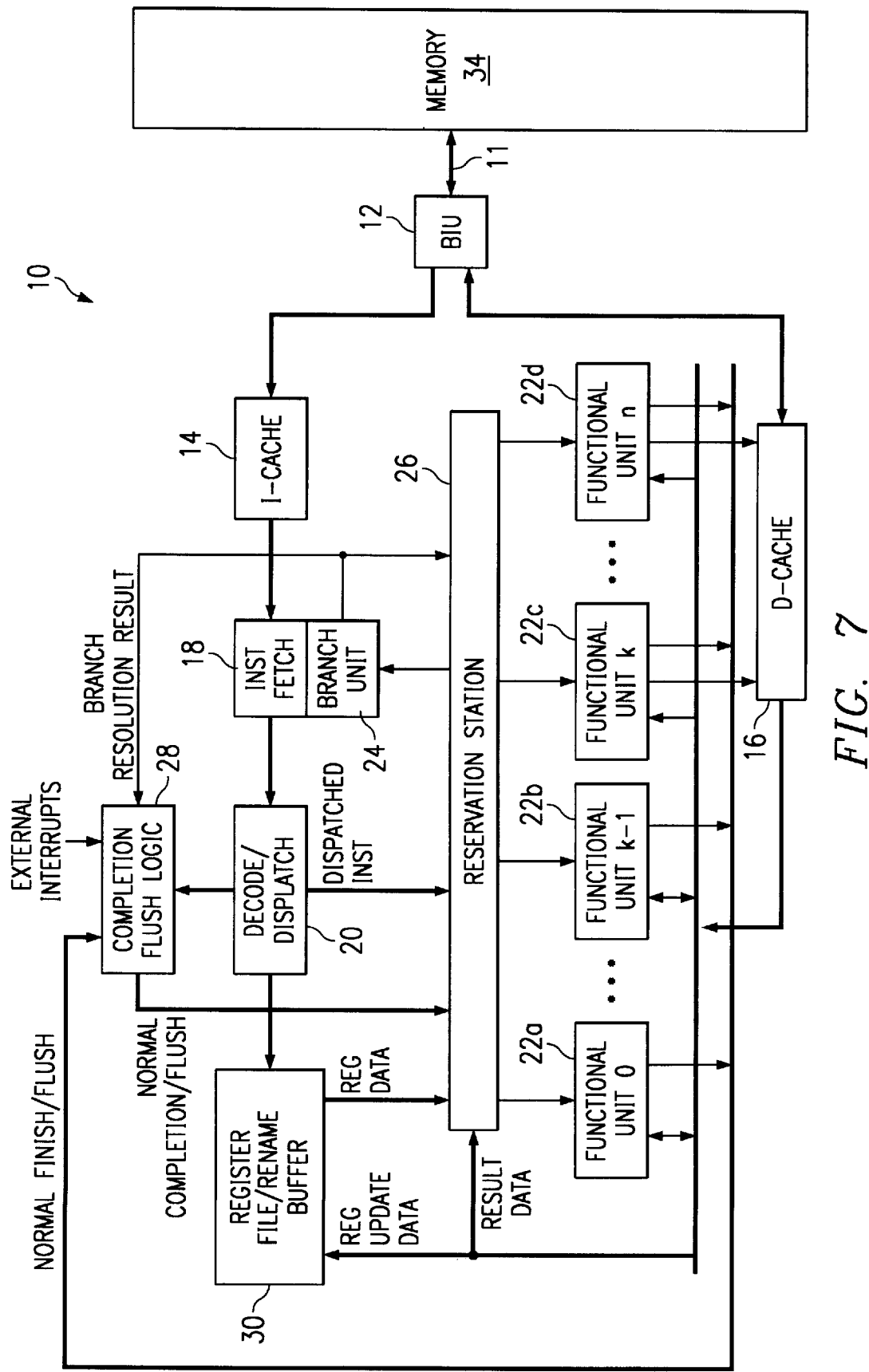
FIG. 7 is a block diagram of a processor useful in accordance with embodiments of the present invention.

FIG. 7 is a block diagram of a processor 10 system for processing information according to an embodiment of the invention. In this embodiment, processor 10 is a single integrated circuit superscalar microprocessor. Accordingly, as discussed further hereinbelow, processor 10 includes various units, registers, buffers, memories, and other sections, all of which are formed by integrated circuitry. As shown in FIG. 7, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to an instruction fetch unit 18. In response to such instructions from instruction cache 14, fetch unit 18 passes instructions to decode/dispatch unit 20 which, in turn, decodes and outputs instructions to other execution circuitry of processor 10.

The execution circuitry of processor 10 includes multiple execution units, also referred to herein as functional units, and shown in the figure as functional units 22a–22d. These functional units include, for example, floating point, fixed point and load/store units, which are conventional in the art.

Processor 10 also contains a branch unit 24 which receives branch instructions from the fetch unit 18 and performs look-ahead operations on conditional branches to resolve them as soon as possible. The branch unit 24 predicts the direction of the conditional branch. Therefore, when an unresolved conditional branch instruction is encountered, the processor 10 fetches instructions from the predicted target stream until the conditional branch is resolved.

Processor 10 also includes a reservation station 26. Reservation station 26 holds instructions until all source data is available and the instructions can be issued to the functional units.

Completion/flush logic 28 retires executed instructions. Completion/flush logic 28 recognizes exception conditions and discards any operations being performed on subsequent instructions in program order. Moreover, in the event of a mispredicted branch, completion/flush logic 28 flushes instructions which are in various stages of being processed by the processor 10 and allows the decode/dispatch unit 20 to begin dispatching from the correct path. Completion/flush logic 28 also receives a signal indicating the receipt of external interrupts which can affect program flow through the processor 10.

Register file 30 provides the physical registers for storing instruction results and operands. Although different architectures exist, the present invention will be described with respect to a unified architected and rename register space, i.e., the architected registers and rename registers are located in the same register file. Whether a physical register is functioning as a rename or an architected register is determined by a status bit associated with the physical register. Register file 30 receives result data from functional units 22a–22d and outputs register data to reservation station 26.

Processor 10 achieves high performance by processing multiple instructions simultaneously at various ones of execution units 22a–22d. Accordingly, each instruction is processed as a sequence of stages, each being executable in parallel with stages of other instructions. The technique of implementing a sequence of stages is called "pipelining" and is conventional in the art. An instruction is normally processed in stages, for example, fetch, decode, dispatch, issue, execute and completion.

In the fetch stage, fetch unit 18 inputs from instruction cache 14 one or more instructions from one or more memory addresses in memory 34 which store the sequence of instructions.

In the decode stage, decode/dispatch unit 20 decodes up to four fetched instructions. In the dispatch stage, decode/dispatch unit 20 selectively dispatches up to four decoded instructions to reservation station 26 after reserving register file entries for the dispatched instructions' results (destination operands). In the dispatch stage, operand information is supplied to reservation station 26 for dispatched instructions. Processor 10 dispatches instructions in program order. In the issue stage, processor 10 issues instructions with available data from reservation station 26 to selected execution units 20a–22d.

In the execute stage, execution units execute their issued instructions and output results of their operations for storage at selected entries in register files. In this manner, processor 10 is able to execute instructions out-of-order relative to their programmed sequence. After executing an instruction, the functional unit signals completion/flush logic 28 that the instruction has executed.

In the completion stage, completion/flush logic 28 determines if instructions have been executed and then processes the oldest instruction first. Processor 10 "completes" instructions in order of their programmed sequence.

Referring now to FIG. 2, there is shown a representation of a rename register map ("RMAP") according to an embodiment of the invention. In practice, the RMAP is implemented as a content addressable memory ("CAM") with associated status bits. The RMAP contains a number of entries, wherein each entry corresponds to a physical register. As shown, each entry of the RMAP includes a plurality of fields. In this example, the RMAP contains a general purpose register ("GPR") field, an A-bit field, and HOD a "history" or H-bit field (also referred to as a history status bit). The RMAP also includes a target instruction identifier ("TID") field. The GPR and A-bit fields operate in a manner similar to that of conventional architectures. Specifically, the GPR contains the pointer of the architected register that forms an architectural-physical pair with the physical register corresponding to the index of the entry. The A-bit field contains a bit which indicates whether the physical register corresponding to the index of the entry has been allocated to contain the most recent value to be written to the architected register.

The TID field contains a unique ID, preferably 6–8 bits in length, that is assigned to each dispatched instruction. If an instruction has two targets, two TIDs will be assigned. The TID is passed to the execution unit and will be used to guide data back to the physical register location and dependent instructions. The TID prevents writeback of data to a target that has already been made available for re-use. In other words, the compression that this invention allows may create a situation in which two active instructions have the same physical register target. The use of TIDs resolves this problem. This is described in greater detail with respect to FIG. 1A.

Referring now to FIG. 1A, when an interruptible instruction is dispatched, an entry is created in the interrupt instruction table 154. When the operands for the instruction become available, they are passed from the instruction pipeline to the appropriate execution unit 150 which performs the required operation. The execution unit 150 is designed, according to known techniques, to detect whether the instruction completes without generating an exception due to an error condition. When the execution unit 150 finishes operating on the instruction, it generates a finish report. The finish report indicates to other resources on the processor whether the instruction was satisfactorily executed by the execution unit 150, or whether an error condition arose requiring the generation of an exception. For purposes of illustration, it will be assumed that no exceptions occurred during the execution of the instruction. In this case, the execution unit 150 generates a finish report which includes the information shown in the figure report block 152. The finish report 152 includes a pointer to the interruptible instruction table entry which was created upon dispatch of the instruction. This pointer is used to set the status bits in the IIT 154 corresponding entry in the interruptible section table 154 to indicate that the instruction has satisfactorily completed. It will be noted that if there is an abnormal completion, then the status bits are used to indicate the type of abnormality. Different types of abnormalities may occur depending on the architecture used, and thus, the status indication will be largely a matter of design choice depending upon the architecture. Such status indication are known of those skilled in the art and are not necessary for a complete understanding of the present invention. The finish report 152 also includes the data generated by the execution unit 150 in accordance with the instruction operands, and the target ID for the architectural register targeted by the instruction. The processor matches the target ID in the finish report with target ID fields in the register file 156 and the issue queue 158. When a match is found, the processor writes the data from the finish report into the data field of the corresponding entry in the register file 156 and/or issue queue 158. Note that in this embodiment of the invention the term issue queue is also used for the reservation station, therefore, issue queue 158 is the same as reservation station 26 shown in FIG. 7.

This technique prevents instructions from improperly updating an entry in the register file, while simultaneously allowing all instructions to receive their required operand data. For example, assume two instructions are issued, instruction 1 and instruction 2, in that order. Each instruction targets the same architectural register. Assume further that instruction 2 completes before instruction 1. In this case, the TID field in the register file 156 corresponding to the targeted architectural register, will be updated with the TID of instruction 2. When instruction 1 completes, its TID will not match the TID for the targeted architectural register, and therefore register file 156 will not be updated with stale data from instruction 1. At the same time, any instructions which issued and require data from instruction 1 as a source operand, are maintained in the issue queue 158. In this case, the TID of instruction 1 will match the TID for any instructions in the issue queue 158 which require operand data from instruction 1. When the processor finds a match, the data from the finish report is written into the corresponding data field and instruction queue 158. Thus, although the data generated by instruction 1 is never written into a physical register in the register file, it is nevertheless available for any issued instructions which require it as operand data.

The H-bit field contains a bit which indicates whether the physical register corresponding to the index of the entry is kept for recovery due to speculative execution that may be abandoned. The operation of this bit will be described in greater detail herein. It is noted that A and H will not both be set at the same time. The GPR field contains the pointer of the architected register that forms an architectural-physical pair with the physical register corresponding to the index of the entry.

For purposes of the following discussion, the term interruptible instruction refers to: (1) branch instructions, (2) speculatively executed load instructions which need to be re-executed because their execution loaded stale data, (3) instructions that can cause exceptions, and (4) instructions associated with an interrupt occurrence.

Also, as used herein, the term "interruptible point" refers to one of the following events associated with the types of interruptible instructions respectively: (1) an unresolved branch instruction which starts speculative execution along the wrong path, (2) a speculatively executed load instruction which executes ahead of the store instruction that produces its load data, (3) the execution of an instruction which causes an exception, and (4) an interrupt which occurs during execution of an instruction. An interrupt is said to occur on the occurrence of one of the above interrupt points.

As stated previously, embodiments of the invention will be described with respect to a unified architected rename register space, i.e., the architected register and rename registers are located in the same register file and, whether a physical register is functioning as a rename or architected register is determined by a status bit associated with the physical register. The number of physical registers is greater than the number of architected registers implemented. The RMAP is initialized at power-on reset so that each architected register is associated with a physical register. An architected register and its associated physical register are referred to as a "rename pair". Whenever an instruction that writes to an architected register is dispatched, a new physical register is associated with the architected register so that the data written by the most recent instruction will be deposited in the new physical register. Any subsequent instruction that reads the operand from the particular architected register will obtain it from the new physical register.

An instruction is ready to complete when all instructions dispatched prior to it, and itself, have executed and their execution does not generate an exception or is not interrupted. Of course, completion of an instruction changes the state of the processor. The processor state at a given point of execution in an in-order-execution processor is defined collectively by the contents of architected registers at the completion of the last instruction execution. When a register is written, the processor changes to a new state. The new state differs from the old state by the new and old values of the register written.

In out-of-order execution processors, only the processor state at an interrupt point is of interest. For a processor that executes out-of-order, the occurrence of an interrupt forces the processor to recover to its known state before the interrupt point. Thus, the architected-physical association pairs ("rename pairs") must be saved before each interrupt point to allow the processor to recover to the known state if necessary. Also, in out-of-order execution, instructions are speculatively dispatched. When instructions need to write to an architected register, the rename pair is established speculatively if there is an outstanding interrupting instruction that has not completed. When a new rename pair is established, the older pair is kept until the instruction that established the newer pair successfully completes without exception or without being interrupted. At such time, the physical register in the older rename pair is recycled for reuse for further instructions. Speculatively established rename pairs will also be nullified when an interruptible instruction causes an interrupt. In such cases, all physical registers of the speculatively established pairs are "recycled" or made available for reuse by subsequently dispatched instructions.

Recovery to the state prior to an interrupt point does not require the rename pairs for all existing instructions. At each interrupt point, the architected state of a processor is defined by the last instructions that write to each architected register. Therefore, only the rename pairs established by these instructions need to be kept. In other words, whenever a rename pair is allocated for a dispatched instruction, the last rename pair of the architected register can be released as long as it is not needed for recovery at the interrupt point and subsequent instructions that need the physical register content as an operand already have obtained it or have the means to obtain it.

Thus, the status of an RMAP entry is determined from the A and H bits according to the following table:

| A | H | Status |
|---|---|--------|
| 0 | 0 | Free physical register |
| 0 | 1 | Physical register saved for recovery |
| 1 | 0 | Architected to contain most recent target data |
| 1 | 1 | Illegal State |

Figure 3:
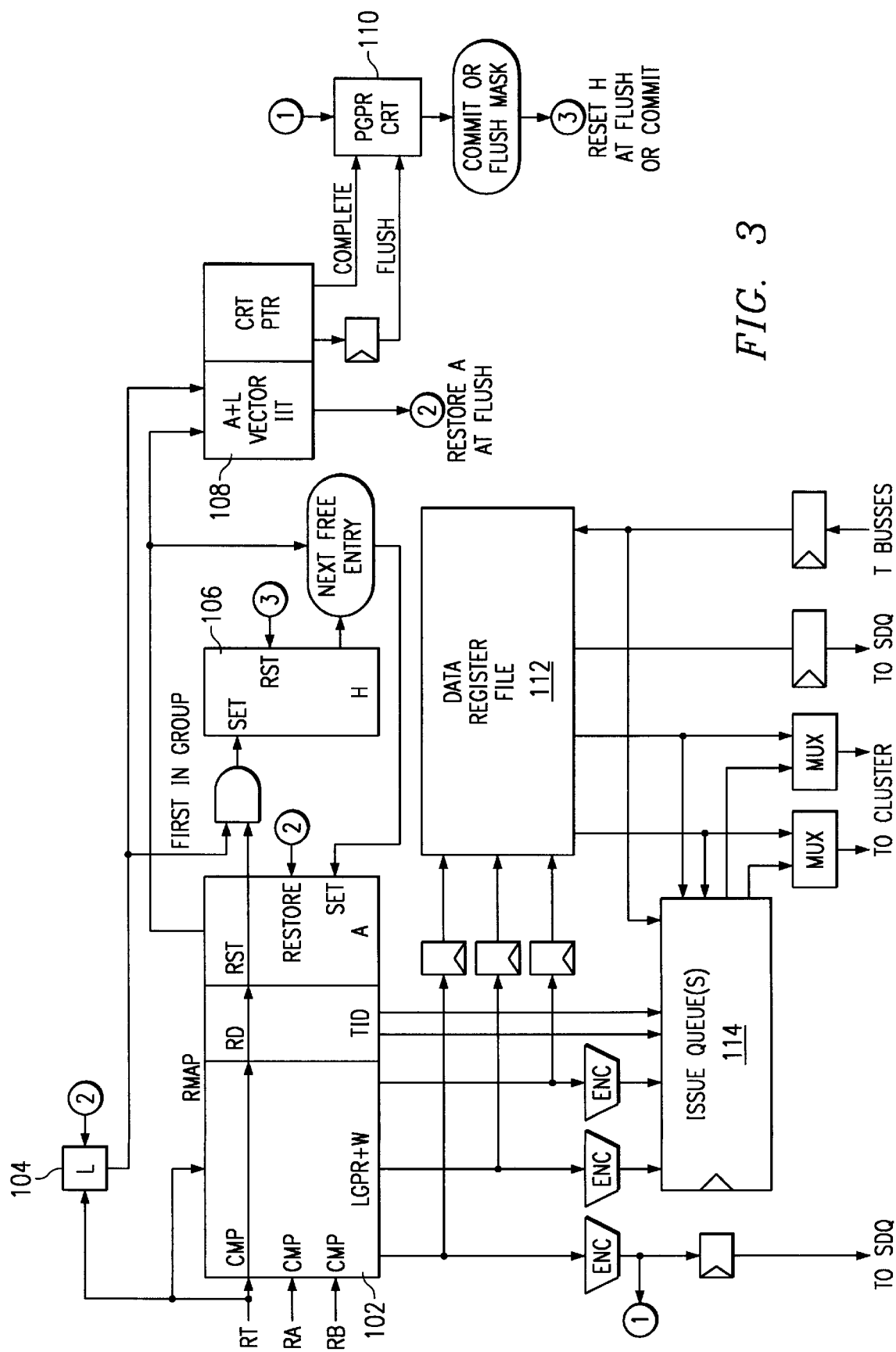
FIG. 3 is a block diagram illustrating an apparatus useful according to an embodiment of the invention.

Referring now to FIG. 3 there is shown a block diagram of an apparatus for implementing a rename scheme according to one embodiment of the invention. The apparatus 100 comprises a register map 102 which is implemented as a content addressable memory. The logical contents of the RMAP 102 are illustrated in FIG. 2. The RMAP 102 has input line RT for receiving a signal indicating that a dispatched instruction targets a certain register, and inputs RA and RB for receiving inputs indicating that a dispatched instruction requires operands, denoted A and B for convenience. The RT signal is also provided to a logical register vector, or "L-vector" 104 which comprises an n bit register, where n is the number of architected registers available on the processor. The operation of the L-vector will be described in greater detail herein. An L-vector for a processor having four GPRs is shown in FIG. 5B.

RMAP table 102 is connected by data lines to issue queues 114 and register file 112. Register file 112 contains the physical registers for the processor. Data from the register file 112 is passed along signal lines to the issue queue 114 so that instructions may be issued from the issue queue 114 once they have been provided with the correct operands. RMAP 102 is also connected to the interruptible instruction table 108 via corresponding data lines. Interruptible instruction table 108 includes circuitry which operates checkpoint recovery table pointer logic which provides a pointer to the checkpoint recovery table FIFO 110 as will be described in greater detail herein.

The contents of the L-vector are supplied to interrupt instruction table ("IIT") 108. The logical structure of the IIT is shown in FIG. 4. As shown, the IIT is a table comprising a plurality of entries, each entry comprising an A-vector field, an L-vector field, and a checkpoint recovery table ("CRT") pointer. The IIT table and its control logic support in-order instruction complete. The specific function of the IIT table is to support the rename management strategy by allowing recovery of the A column of the RMAP and the L-vector at a flush and to recycle the physical register saved in the CRT. Recovery to a previous processor state by retrieving a saved A-bit column that has been described previously. The invention allows for improved physical register recycling time by the use of the checkpoint recovery table in the H-bit as will be described in greater detail herein.

On dispatch, only an interruptible instruction creates a new entry in the IIT. In one embodiment, the IIT is implemented as a FIFO structure. The A-vector and the L-vector at the time of dispatch are entered in the field of a new entry in the IIT. At the same time, the next free CRT entry pointer, i.e. a pointer to the address of the next free CRT entry, is entered in the CRT pointer field of the new IIT entry.

When an IIT entry becomes the "head", i.e. the oldest entry, of the FIFO queue, and a functional unit reports execution of the interruptible instruction without exception, the IIT entry is ready to complete the instruction and release the resources held by instructions preceding the interruptible instruction in program order. Therefore, the CRT pointer of the next IIT entry is sent to the CRT control logic of the IIT 108. It will be noted that if the head IIT entry is also the "tail" entry, i.e. the next available entry, the next free CRT entry is sent. Then, the head IIT pointer is advanced.

When the instruction of the IIT entry reports a flush condition, the IIT control sends the CRT entry pointer of the IIT entry to the CRT control logic of the IIT 108, the A-vector to the RMAP 102, and the L-vector to the L-vector register 104. The IIT entry that causes the flush becomes the next free IIT entry.

As shown, the IIT 108 is connected to checkpoint recovery table ("CRT") 110. The checkpoint recovery table 110 operates with the IIT in the event of a completed instruction, or an excepting instruction, to recover to the previous state. In one embodiment, the CRT 110 is implemented as a FIFO queue. Each entry in the queue contains a physical register field and a valid bit as shown in FIG. 5A.

With respect to the operation of the CRT, it will be noted that an instruction is ready to commit when its preceding interruptible instructions (including itself if it is an interruptible instruction) have been determined by the relevant execution units not to cause an exception which would require a flush of speculatively created data. Physical registers needed for possible recovery for an interruptible instruction are released under one of two conditions. First, when the interruptible instruction is committed, and second, when an interruptible instruction causes a flush and physical registers are in rename pairs created by the interruptible instruction and instructions subsequent to the interruptible instruction. With respect to the first condition, it is noted that, given an RMAP entry for which the H bit is set by a newly dispatched instruction, its physical register pointer is saved in the FIFO queue, i.e., the CRT. At the time for an interruptible instruction to commit, the instruction completion logic of the IIT, with respect to the retiring interruptible instruction, sends a CRT pointer from CRT control logic in IIT 108 which points to the CRT entry one location beyond the last physical register pointer backed up for the interruptible instruction in IIT 108. If the interruptible instruction is the last one dispatched, the CRT pointer pointing to the next CRT entry is sent instead. Upon receiving the pointer, the CRT control logic in IIT 108 will build a mask vector having a multiplicity of bits, one for each CRT entry, such that bits corresponding to the CRT entries from the head of the CRT queue 110 to the entry prior to the received pointer will be set. The valid bits of the CRT entries corresponding to the set mask bit are reset to indicate the entries are retired, i.e. made available for use by subsequently dispatched instructions. The head of the CRT queue 110 is then moved to the pointer sent by the completion logic. The physical register pointer field in each of the retired entries is expanded into a bit vector. The expanded bit vectors are logically ORed together to form a reset mask to reset the H-bits corresponding to the asserted bit in the reset mask.

In the event of a flush, the CRT pointer in the IIT entry associated with the interruptible instruction which caused the flush, is sent to the CRT control logic. Upon receiving the CRT pointer, the CRT control logic builds a mask with asserted bits corresponding to CRT entries starting from the entry pointed to by the received CRT pointer up to the entry (but not including) pointed to by the next free CRT entry pointer. All the CRT entries in the mask will be invalidated and the next free CRT entry pointer will be reset to the value of the received CRT pointer. The physical register pointer in each of the invalidated CRT entries will be expanded into a bit vector. The expanded bit vectors are logically ORed together to form a reset mask to reset the H-bits corresponding to the asserted bit in the reset mask.

Figure 6:
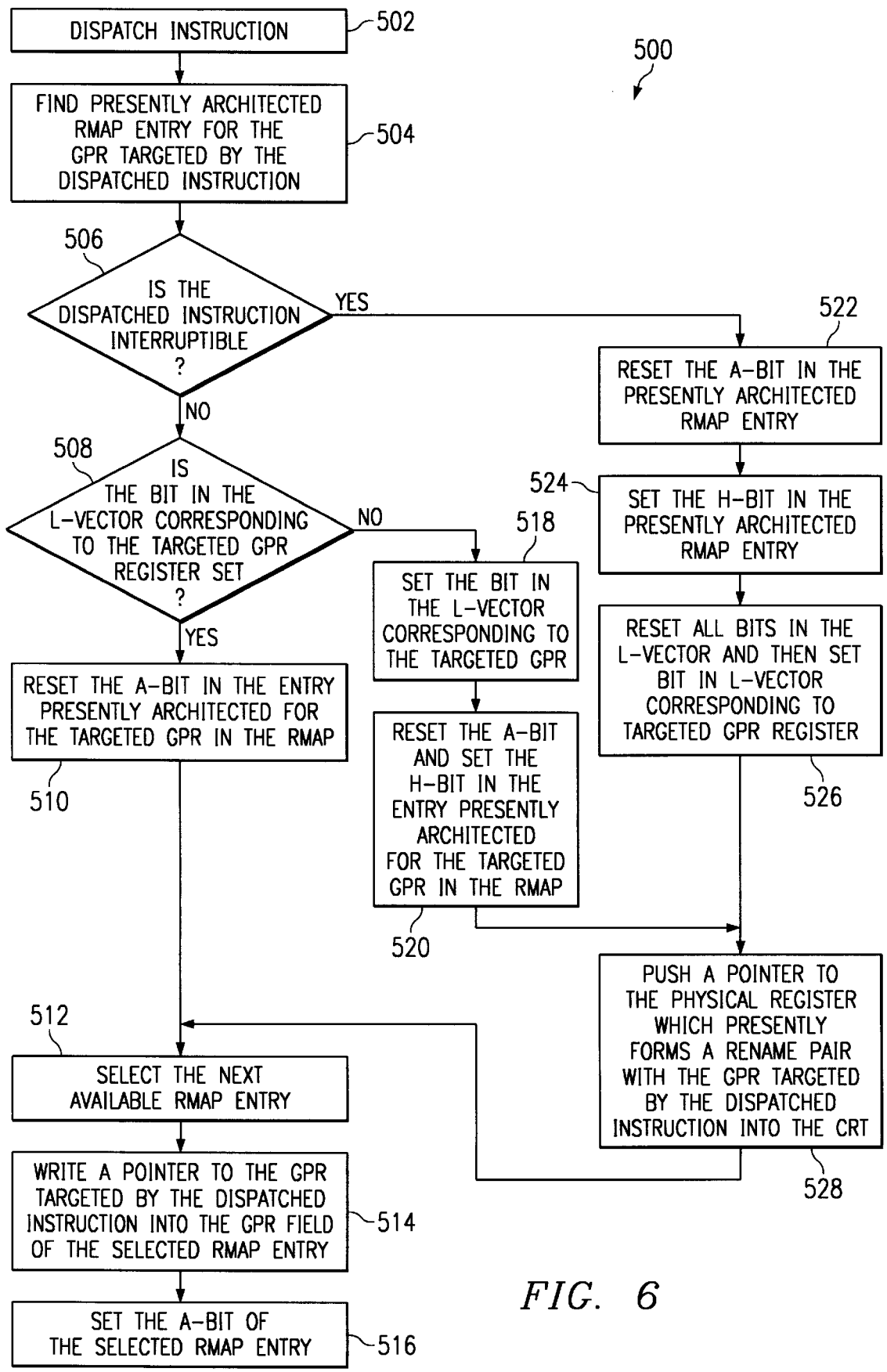
FIG. 6 is a flow chart illustrating the operation of an RMAP according to an embodiment of the invention.

FIG. 6 is a flow chart 500 illustrating the steps taken by the processor to update the RMAP upon dispatch of instructions according to one embodiment of the invention. In this embodiment, an instruction is dispatched at step 502. At step 504, the processor searches for the presently allocated RMAP entry for the GPR targeted by the dispatched instruction. Since the RMAP is typically implemented as a CAM, the processor performs step 504 by comparing the GPR targeted by the dispatched instruction to the GPR field in each entry of the RMAP table, beginning with entry 0 which corresponds to physical register 0. When the entry in the RMAP is found which identifies the physical register currently architected as the GPR register which is targeted by the dispatched instruction, the process proceeds to step 506 where the processor determines whether the dispatched instruction is interruptible. If the dispatched instruction was not interruptible, then the processor proceeds to step 508 and checks whether the bit in the L-vector corresponding to the targeted GPR is set. If the bit is set then the processor proceeds to step 510 while it resets the A-bit in the entry presently architected for the targeted GPR in the RMAP. In this case, both the A-bit and the H-bit will be inactive. Thus, the physical register associated with this entry is now available for reuse by a subsequent dispatched instruction.

If, however, in step 508 the processor determines that the corresponding bit in the L-vector is not set, then it proceeds to step 518 where it sets the bit in the L-vector corresponding to the targeted GPR and then to step 520 where it resets the A-bit then sets the H-bit in the entry which is presently architected for the GPR. After the A-bit has been reset and the H-bit set in the entry presently architected for the targeted GPR, the processor then proceeds to step 528 wherein a pointer is pushed to the physical register onto the checkpoint recovery table. As discussed in greater detail below, the pointer indicates the physical register presently forming a rename pair with the GPR targeted by the instruction.

However, if in step 506 the dispatched instruction was an interruptible instruction, then the processor proceeds from step 506 to step 522. In step 522, the processor resets the A-bit in the presently allocated RMAP entry. The processor then proceeds to step 524 where the H-bit is set in the entry. This causes the processor to save the data stored in the physical register associated with the entry for purposes of a possible recovery. The processor then resets all bits in the L-vector in step 526 so that the processor can determine whether a particular GPR has been written by an instruction which has been dispatched subsequent to the last dispatched interruptible instruction. It is to be understood that, in the case of multiply dispatched interruptible instructions, multiple L-vectors will be required.

In step 526, the processor then sets the bit and the L-vector which corresponds to the targeted GPR register dispatched in step 502 according to an embodiment of the invention.

In step 528, the processor then pushes a pointer to the physical register onto the checkpoint recovery table. This pointer points to the physical register which presently forms a rename pair with the GPR targeted by the instruction. This data is used to reconstruct the H column of the RMAP at a particular point in program execution if a recovery is required.

After completion of step 510 or 528, the processor then proceeds to step 512 where it selects the next available RMAP entry. Once the next available RMAP entry is selected, the processor, in step 514, then writes a pointer to the GPR targeted by the dispatched instruction into the GPR field of the selected RMAP entry. Finally, in step 516, the processor sets the A-bit of the selected RMAP entry. This indicates that the selected entry is the now currently architected entry for the GPR and is not available for use by a subsequently dispatched instruction.

Figure 8:
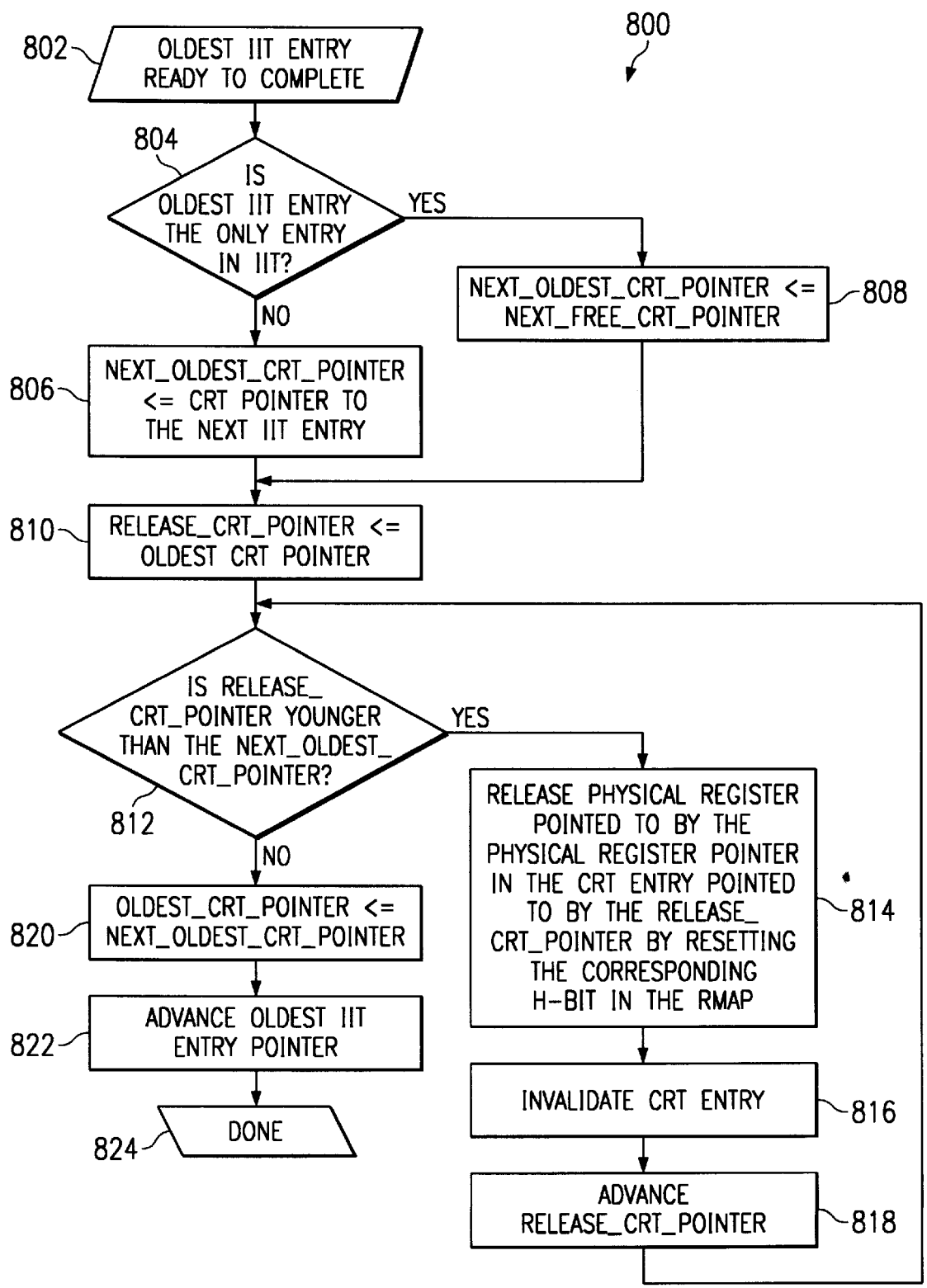
FIG. 8 is a flow chart illustrating the operation of a processor on completion of an instruction according to an embodiment of the invention.
Figure 9:
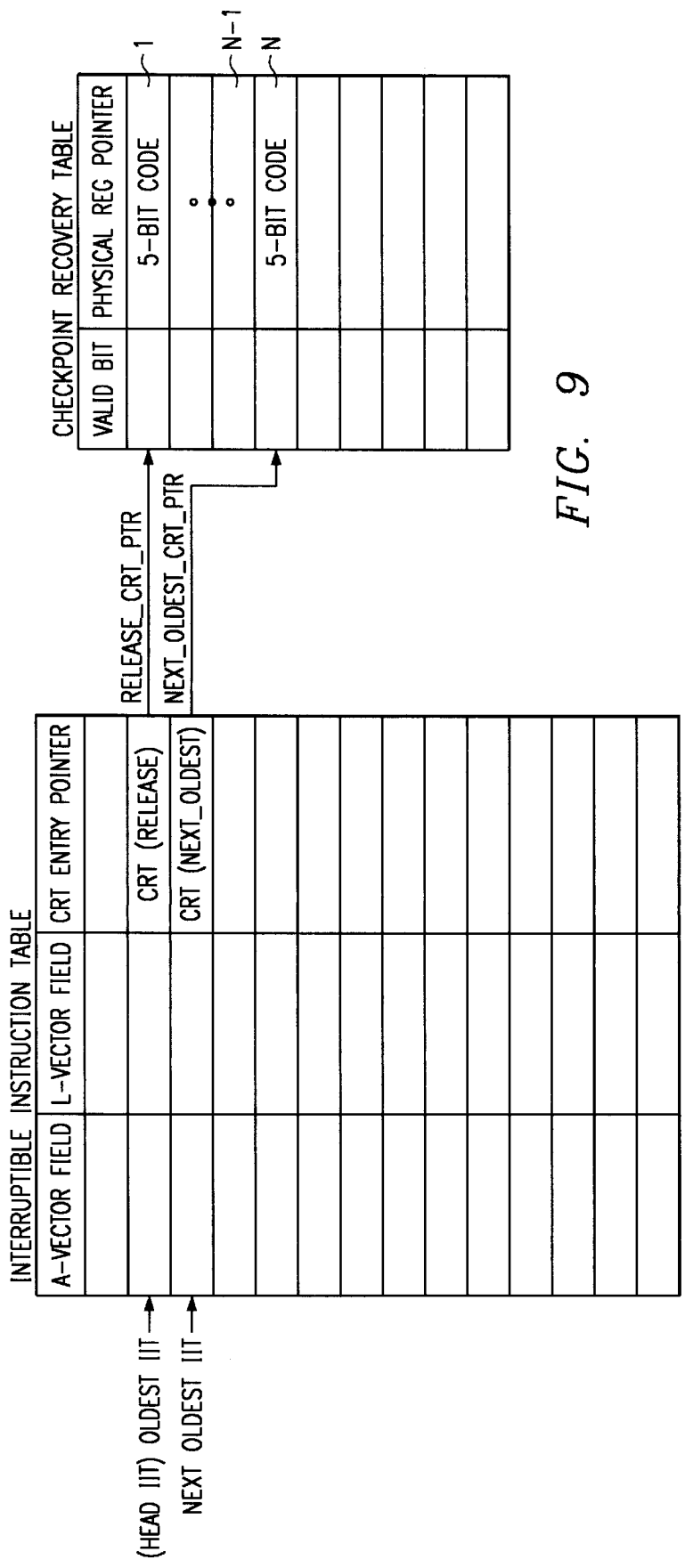
FIG. 9 depicts the assignment of CRT entry pointers to temporary variables which point to corresponding entries in the CRT during instruction completion according to an embodiment of the invention.

The operation of the invention, according to one embodiment, will be described in greater detail with respect to FIGS. 8 and 9 illustrating the release of backup registers on completion of an instruction. FIG. 8 is a flowchart 800 illustrating the operation of one embodiment of the invention upon completion. In this case, in step 802, the process begins when the oldest IIT entry is ready to complete. As discussed previously, an entry is ready to complete when the execution unit generates the finished report for the entry. In step 804, the processor determines whether the oldest IIT entry (i.e., the entry pointed to by the head pointer of the IIT table) is the only entry in the IIT table. If not, flow proceeds to step 806 where the processor defines a temporary variable, referred to as next_oldest_CRT_pointer. This variable may be stored in memory or in a register on the processor. Next_oldest_CRT_pointer is assigned the CRT pointer from the CRT entry pointer field of the interruptible instruction table corresponding to the entry in the interruptible instruction table which is located one entry past the entry pointed to by the interruptible instruction table head pointer. In other words, the entry in the interruptible instruction table which would be pointed to by the head pointer incremented by one.

Of course, if there is only one entry in the IIT table, then there would be no valid CRT entry pointer in the CRT entry pointer field immediately ahead of the entry pointed to by the head pointer of the IIT. In this case, the next_oldest_CRT_pointer variable is assigned the next free CRT pointer in step 808.

Flow then proceeds to step 810 where the processor defines another variable, referred to as release_CRT_pointer. This variable is also stored on the processor. In step 810, the variable release_CRT_pointer is assigned with the oldest CRT pointer. The oldest CRT pointer is, of course, obtained from the CRT entry pointer field in the IIT table entry which is pointed to by the IIT head pointer. The operation of these pointers will be explained in greater detail with reference also to FIG. 9.

FIG. 9 shows the IIT and the CRT after the assignment of next_oldest_CRT_pointer and release_CRT_pointer. As shown, the variable release_CRT_pointer now corresponds to a head pointer in the CRT recovery table pointing to the oldest CRT entry associated with the interruptible instruction which created the head, or oldest, entry in the IIT. The variable next_oldest_CRT_pointer points to an entry in the CRT table in a number of entries beyond the entry pointed to by release_CRT_pointer. In other words, these two pointers define a range of entries 1 through n in the CRT table. Since the instruction which created the head entry in the IIT table has now completed successfully, all physical registers in CRT entries 1 through (n-1) may now be released for reuse by subsequent instructions. This release is, as described previously, performed by clearing the corresponding H-bits in the RMAP.

According to embodiments of the present invention, two techniques are used for clearing these H-bits in the RMAP. One embodiment is shown in steps 812–818 of the flowchart in FIG. 8. In step 812, flow passes to a decision block which determines whether the release_CRT_pointer is younger than the next_oldest_CRT_pointer. If so, flow proceeds to step 814 where the physical register pointed to by the physical register pointer in the CRT entry pointed to by release_CRT_pointer is released by resetting the corresponding H-bit in the RMAP. In step 816, the CRT entry is then invalidated by resetting the valid bit for the CRT entry. Flow then proceeds to step 818 where the release_CRT_pointer is advanced by one and flow then loops back to step 812 where the release and the next_oldest_pointers are again compared. If the release pointer is still younger than the next_oldest_pointer then the physical register pointer in the checkpoint recovery table entry pointed to by the advanced release pointer is then released by resetting the corresponding H-bit in the RMAP. Flow then again proceeds to steps 816–818.

This loop is repeated until the release pointer matches the next_oldest_pointer. In this case, flow proceeds to step 820 where the oldest CRT pointer is assigned the next_oldest_CRT_pointer. Flow then proceeds to step 822 and the head pointer in the IIT entry is advanced. At this point, all physical registers not required for recovery have been made available for reuse.

Figure 10:
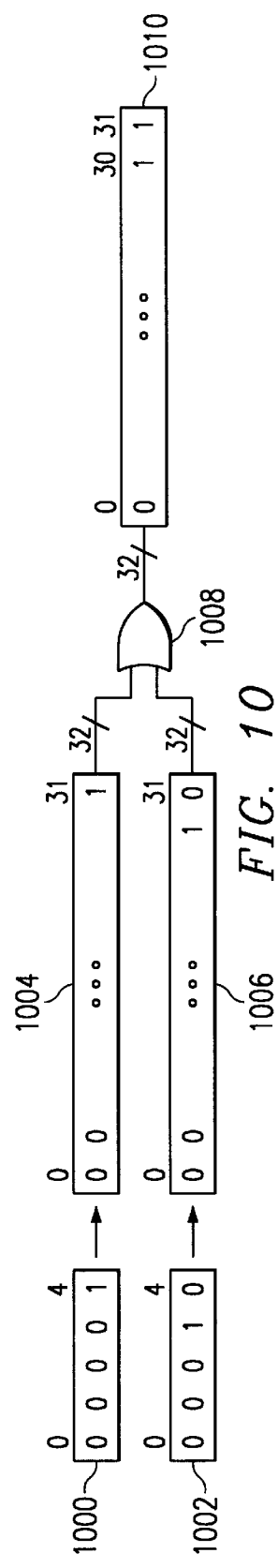
FIG. 10 depicts the expansion of 5-bit pointers to physical registers into 32-bit vectors for use in recovering the H column of the RMAP according to an embodiment of the invention.

According to another embodiment of the invention, the release of the physical registers may be performed in a parallel fashion. In this embodiment, it is noted that the physical register pointers in the CRT entries are typically encoded in order to conserve bit-wise register space. In other words, for an RMAP having 32 physical registers, each physical register can be identified by a 5-bit binary value. Thus, in one embodiment, the physical register pointers in the CRT comprise 5-bit codes which uniquely identify a corresponding physical register. These 5-bit codes are then expanded into 32-bit long vectors which are then ORed together to form a mask. This mask is then used to reset the corresponding H-bits in the RMAP column. This is explained in greater detail with respect to FIG. 10. FIG. 10 shows an example in which the release_pointer and the next_oldest_pointer in the CRT differ by two entries. Therefore, there will be two physical registers to be released.

These physical registers have corresponding physical register pointers 1000 and 1002 retrieved from the CRT. Physical register pointer 1000 has a value of 1, physical register pointer 1002 has a value of 2. Assuming bit 4 in the registers is the least significant bit, these values are represented in binary fashion in FIG. 10. Each of the values is expanded into a 32-bit vector in which only one bit in the vector will be set which corresponds to the associated physical register. In this case, physical register pointer 1000 is expanded into bit vector 1004 in which bit 31 is set.

This corresponds to, for example, physical register 0 in the RMAP. Similarly, physical register pointer 1002 is expanded into 32-bit vector 1006 in which only bit 30 is set. This corresponds to, for example, physical register 1 in the RMAP. Vectors 1004 and 1006 are then bit-wise ORed through OR gates 1008 and the result is stored in vector 1010. Of course, in vector 1010 bits 30 and 31 are set. Vector 1010 is then used as a mask to reset the bits in the H column of the RMAP.

Figure 11:
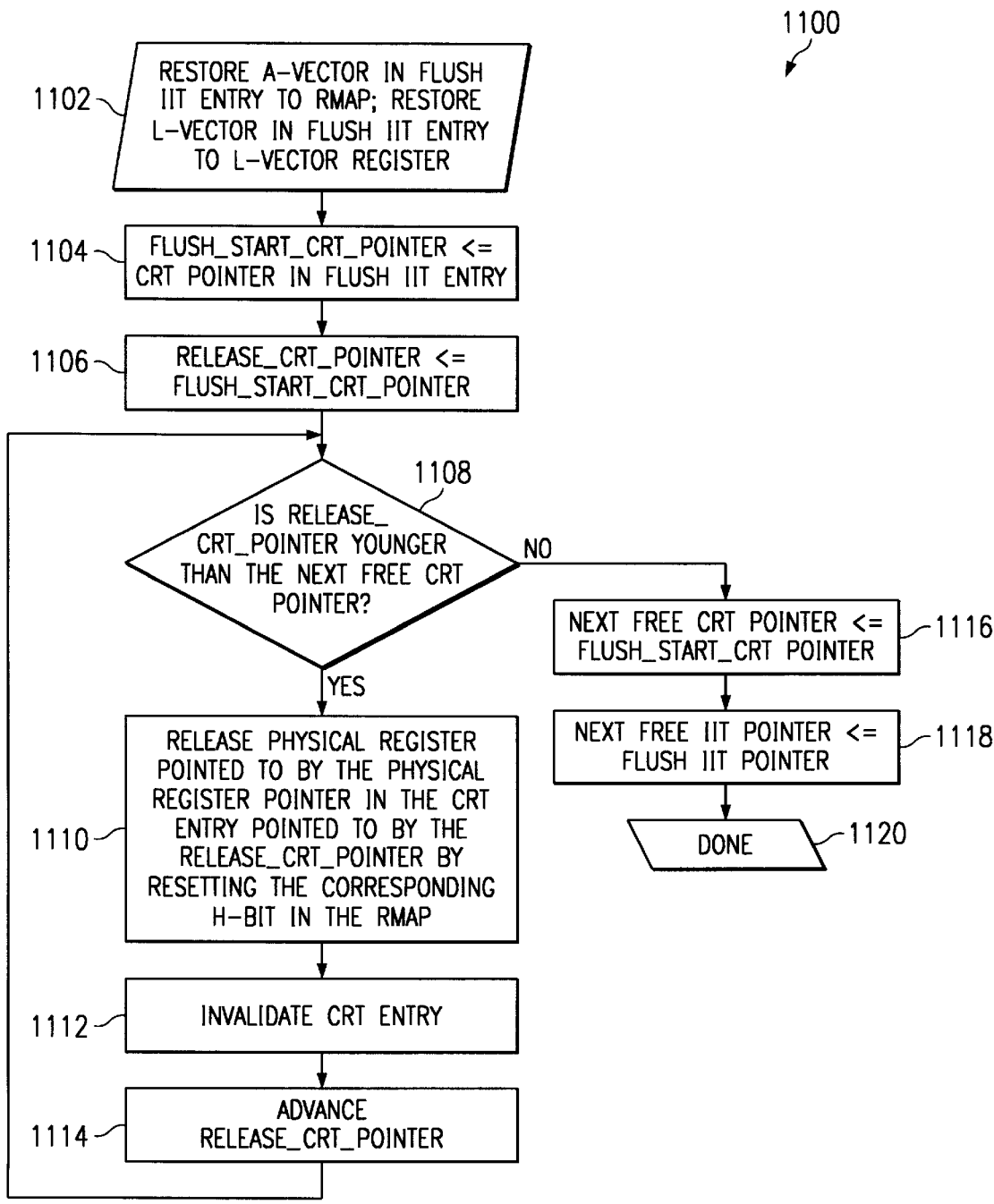
FIG. 11 is a flow chart according to still a further embodiment of the invention depicting the operation of the processor upon a flush condition.

FIG. 11 is a flowchart illustrating the operation of an embodiment of the invention which releases physical registers on a flush condition. When the finished report from an execution unit indicates that an instruction has completed abnormally, for example, an exception condition exists due to a mispredicted branch, the process begins in step 1102. In step 1102, the A-vector and L-vector stored in the A-vector and L-vector fields in the IIT entry corresponding to the instruction which caused the flush condition are retrieved from the IIT and used to restore the A-bit column in the RMAP and the L-vector, respectively.

Flow then proceeds to steps 1104 and 1106 where the processor assigns the CRT pointer from the CRT pointer field in the IIT entry for the flush causing instruction to two temporary variables referred to as flush_start_CRT_pointer and release_CRT_pointer. The reason for assigning two variables with the same pointer will be apparent in view of the following.

Figure 12:
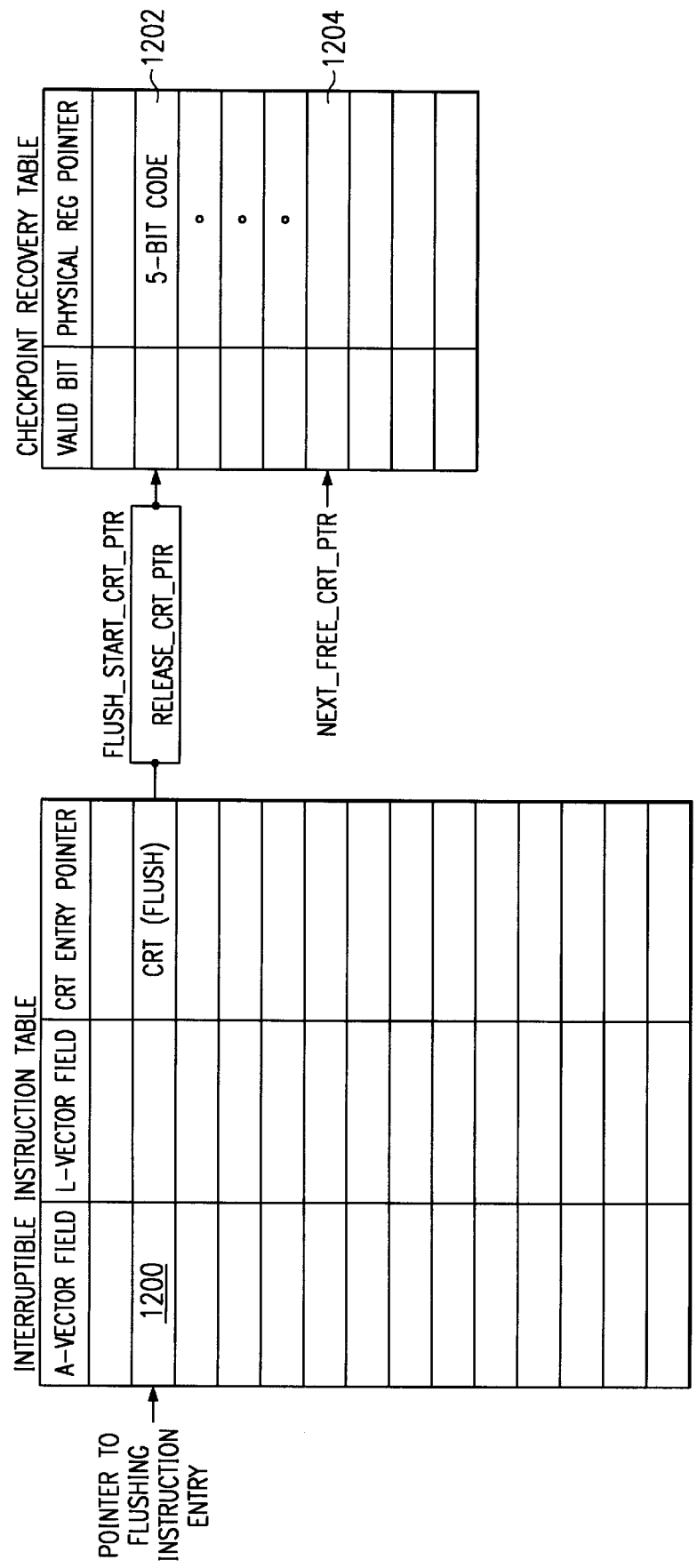
FIG. 12 depicts the use of the CRT entry pointer in the CRT entry pointer field of the flushing instruction to generate two temporary variables for pointing into the CRT on a flush condition.

The assignment of the above variables is illustrated with respect to the IIT and the CRT shown in FIG. 12. In this case, it is seen that the flushing instruction entry 1200 contains a corresponding pointer to the CRT in the CRT entry pointer field. This is indicated as a CRT "flush" pointer. This pointer is then loaded into the two variables flush_start_CRT_pointer and release_CRT_pointer which both point to the corresponding entry in the CRT. It will also be understood that the next free entry in the CRT is tracked by a pointer, referred to herein as the next_free_CRT_pointer which points to entry 1204 shown in FIG. 12. As will be clear from FIG. 12, the pointers flush_start CRT_pointer and next_free CRT_pointer define a range of entries in the CRT.

Referring again to FIG. 11, the processor then proceeds to step 1108 where it determines whether the release_CRT_pointer is younger than the next_free_CRT_pointer. If so, then flow proceeds to step 1110 where the physical register pointed to by the physical register pointer field of the CRT entry pointed to by release_CRT_pointer is made available for use by resetting the H-bit corresponding to the physical register in the RMAP. Flow then proceeds to step 1112 where the validity bit is reset for the CRT entry pointed to by release_CRT_pointer. Next, flow proceeds to step 1114 where release_CRT_pointer is advanced to point to the next entry in the CRT table.

The loop defined by steps 1108–1114 is repeated until the release_CRT_pointer points to the same entry as the next_free_CRT_pointer. In this case, flow proceeds to step 1116 where the next_free_CRT_pointer is assigned with a value of flush_start CRT_pointer. In this way, the next_free_CRT_pointer now points a starting entry in the CRT from which the flush began. In this way, the CRT entries 1202–1204 may be reused. Flow then proceeds to step 1118 where the next free IIT pointer is assigned with the flush IIT pointer. This step serves to make available the IIT entries beginning from the start of the flush point in the IIT. Flow then proceeds to 1120 indicating the process is done. It will be clear to those of skill in the art that, by step 1120, all physical registers which were reserved by instructions after the flush point have been released for reuse, and the pointers in the IIT and CRTs have been reset. Thus, the state of the machine has been restored to the state immediately preceding the issue of the flush causing instruction.

It will also be understood that steps 1108–1114 represent the serial manner for resetting the H-bits in the RMAP for the physical registers to be released. Of course, it will be clear that a parallel method could also be used similar to that described in FIG. 10 for the valid completion case.

Although the invention has been illustrated with respect to particular embodiments, it will be understood by those skilled in the art that minor variations in form and detail may be made without departing from the scope and spirit of the present invention. All documents described herein are hereby incorporated by reference as though set forth in full.

What is claimed is:

1. A method for operating a processor, the method comprising:

dispatching an instruction;

determining a presently architected register map ("RMAP") entry for the architectural register targeted by the dispatched instruction;

determining whether the dispatched instruction is interruptible; and updating an architectural indicator and an historical indicator in the presently architected RMAP entry if the dispatched instruction is uninterruptible.

2. A method as in claim 1 wherein updating an architectural indicator and an historical indicator comprises clearing an architectural indication bit and setting a historical indication bit in the presently architected RMAP entry.

3. A method as in claim 1 wherein determining a presently architected RMAP entry comprises comparing a pointer to the architectural register targeted by the dispatched instruction to an architectural register field in the RMAP.

4. A method as in claim 1 further comprising updating a logical vector having a plurality of bits which correspond to the architected registers when an interruptible instruction is dispatched by setting a bit in the logical vector which corresponds to the architected register targeted by the dispatched instruction.

5. A method as in claim 4 wherein updating an architectural indicator and an historical indicator comprises clearing an architectural indication bit in the presently architected RMAP entry and setting an history indication bit in the presently architected RMAP entry if the bit in the logical vector corresponding to the targeted architected register is reset when the instruction is dispatched.

6. A method as in claim 2 wherein updating an architectural indicator and an historical indicator comprises resetting only the architectural indication bit in the presently architected RMAP entry if the bit in the logical vector corresponding to the targeted architected register is set when the instruction is dispatched.

7. A method as in claim 1 comprising resetting an architectural indication bit, setting a history indication bit in the RMAP and resetting all bits in a logical vector in the presently architected RMAP entry if the dispatched instruction is interruptible.

8. A method as in claim 7 further comprising storing a pointer to the presently architected RMAP entry when the history indication bit is set into a checkpoint recovery table.

9. A method as in claim 1 further comprising determining an available RMAP entry and writing an architected register pointer to the architected register targeted by the dispatched instruction into the architected register field of the available RMAP entry and setting the architectural indication bit of the available RMAP entry.

10. A method as in claim 1 wherein the physical register associated with the instruction is released when the instruction passes the interrupt point.

11. A method for maintaining the state of a processor having a plurality of physical registers and a rename register map which stores rename pairs that associate architected and physical registers, the rename register map having a plurality of entries which are associated with the physical registers, individual entries having an architected register field, an architected status bit and a history status bit, the method comprising:

dispatching an instruction which targets an architected register;

determining a presently architected entry in the rename register map in which an architected pointer in the architected register field of the entry matches the architected register pointer of the architected register targeted by the dispatched instruction and the architected status bit is set;

if the dispatched instruction is interruptible: resetting the architected status bit and setting the history status bit in the entry;

determining a next available rename register map entry;

writing a pointer to the architected register targeted by the instruction into the architected register field and setting the architected status bit in the next available rename register map entry.

12. A method as in claim 11 further comprising resetting all bits in a logical register vector if the dispatched instruction is interruptible, the bits in the logical register vector corresponding to the architected registers of the processor and setting a bit in the logical register corresponding to the architected register target by the instruction.

13. A method as in claim 12 further comprising writing a pointer to the physical register which forms a rename pair with the targeted architected register in the presently architected rename register map entry into a checkpoint recovery table.

14. A method as in claim 12 further comprising resetting the architectural status bit in the presently architected entry if the bit in the logical register vector corresponding to the targeted architected register is set and the dispatched instruction is uninterruptible.

15. A method as in claim 12 further comprising setting the bit in the logical register vector corresponding to the targeted architected register if the bit in the logical register vector corresponding to the targeted architected register was not set and the dispatched instruction is uninterruptible.

16. A method as in claim 15 further comprising resetting the architected status bit and setting the history status bit of the presently architected entry.

17. An apparatus for maintaining the state of a processor having a plurality of physical registers and a rename register map which stores rename pairs that associate architected and physical registers, the rename register map having a plurality of entries which are associated with the physical registers, individual entries having an architected register field, an architected status bit and a history status bit, the apparatus comprising:

means for dispatching an instruction which targets an architected register;

means for determining a presently architected entry in the rename register map in which an architected pointer in the architected register field of the entry matches the architected register pointer of the architected register targeted by the dispatched instruction and the architected status bit is set;

means for resetting the architected status bit and setting the history status bit in the entry if the dispatched instruction is interruptible;

means for determining a next available rename register map entry;

means for writing a pointer to architected register targeted by the instruction into the architected register field and setting the architected status bit in the next available rename register map entry.

18. An apparatus as in claim 17 further comprising means for resetting all bits in a logical register vector if the dispatched instruction is interruptible, the bits in the logical register vector corresponding to the architected registers of the processor and setting a bit in the logical register corresponding to the architected register targeted by the instruction.

19. An apparatus as in claim 18 further comprising means for writing a pointer to the physical register which forms a rename pair with the targeted architected register in the presently architected rename register map entry into a checkpoint recovery table.

20. An apparatus as in claim 18 further comprising means for resetting the architectural status bit in the presently architected entry.

21. An apparatus as in claim 18 further comprising means for setting the bit in the logical register vector corresponding to the targeted architected register if the bit in the logical register vector corresponding to the targeted architected register was not set.

22. An apparatus as in claim 21 further comprising means for resetting the architected status bit and setting the history status bit of the presently architected entry if the bit in the logical register vector corresponding to the targeted architected register was not set and the dispatched instruction is uninterruptible.

* * * * *